United States Patent
Flentge

[19]

[11] Patent Number: 5,526,866
[45] Date of Patent: Jun. 18, 1996

[54] TONNEAU COVER FASTENING SYSTEM

[76] Inventor: Rich Flentge, Rte. 7, Box 129, Benton, Ky. 42025

[21] Appl. No.: 249,639

[22] Filed: May 26, 1994

[51] Int. Cl.⁶ ..................................................... B60J 7/10
[52] U.S. Cl. .............. 160/380; 24/72.7; 52/279; 160/377; 160/379; 296/100
[58] Field of Search ............... 296/100; 160/380, 160/381, 379, 377; 24/72.5, 72.7, 114.12, 113 MP, 68 CD, 114.5; 52/278, 279, 280

[56] References Cited

U.S. PATENT DOCUMENTS

| | | | |
|---|---|---|---|
| 2,627,311 | 2/1953 | Kaufmann | 160/395 |
| 4,153,981 | 5/1979 | Stuppy | 24/243 |
| 4,279,064 | 7/1981 | Simme | 24/248 |
| 4,341,255 | 7/1982 | Mock | 160/369 |
| 4,607,876 | 8/1986 | Reed | 296/100 |
| 4,639,033 | 1/1987 | Wheatley et al. | 296/100 |
| 4,647,103 | 3/1987 | Walblay | 296/100 |
| 4,730,866 | 3/1988 | Nett | 296/100 |
| 4,789,197 | 12/1988 | Lewis | 296/100 |
| 4,792,179 | 12/1988 | Stevens | 296/100 |
| 4,807,921 | 2/1989 | Champie, III et al. | 296/100 X |
| 4,838,602 | 6/1989 | Nett | 296/100 |
| 4,926,605 | 5/1990 | Milliken et al. | 52/63 |
| 5,121,960 | 6/1992 | Wheatley | 296/100 |
| 5,165,750 | 11/1992 | Pirhonen | 296/100 |
| 5,203,055 | 4/1993 | Broadwater, Sr. | 24/462 |
| 5,207,262 | 5/1993 | Rushford | 160/354 |
| 5,263,761 | 11/1993 | Hathaway et al. | 296/100 |
| 5,275,458 | 1/1994 | Barben et al. | 296/100 |

*Primary Examiner*—David M. Mitchell
*Assistant Examiner*—Kia M. Robinson

[57] ABSTRACT

A tonneau cover for covering an opening in a structure, the opening having a periphery, the structure having a front shelf, side rails, and an end gate, and the cover including a fastening system for securing a frame to a flexible fabric web, the improvement wherein the frame employs a plurality of h-shaped rail members and L-shaped rail members connected by fastening members, for assembling an unlimited sized flexible fabric web to the frame.

7 Claims, 3 Drawing Sheets

TONNEAU COVER FASTENING SYSTEM

BACKGROUND OF THE INVENTION present invention relates to an adjustable framed fastening tonneau system for providing a weatherproof covering over an opening in various structures, including open bed trucks.

The development and utilization of tonneau covers has increased dramatically over the last 10 years. At first, snap-on assemblies provided a user with a quick shelter without great expense. Those assemblies generally included flexible covers which stretched around a frame or a truck wall. This type of arrangement was undesirable because it required the extensive use of tools to pull the cover and mate the snaps. Furthermore, once the snap receptacles were in place, they could not be removed without leaving the vehicle permanently disfigured.

Other types of flexible tonneau covers include the use of VELCRO™ hook fasteners or some similar adhesive to affix to the top of the rail on the open bed. VELCRO™ rarely seals rain and water and adhesive seals fail during cold weather.

For example, U.S. Pat. No. 4,496,183 discloses a covering system, wherein the flexible sheet is secured to a frame by means of continuous connectors which can include VELCRO™ materials, adhesive tapes, oppositely polarized magnets or a combination of magnets and steel plates. VELCRO™ or hook-and-loop fasteners are known to have a limited useful life after which the hook portions degrade the loop portions to a service level that is no longer satisfactory. Adhesive tapes have an even more limited useful life, while magnet systems cannot produce high holding force levels.

A fastening system is shown in U.S. Pat. No. 4,639,033 wherein the system uses a flexible sheet attached to a frame by means of extruded plastic fasteners. The fasteners are hard to work with under variable weather conditions which may cause the flexible sheet material to expand or contract. If the flexible sheet expands or contracts, the extruded fastener may detach from the frame.

U.S. Pat. No. 5,207,262 discloses a tonneau cover system, wherein a flexible sheet is attached to a frame by means of connector parts, such as a plurality of plastic button members.

Other patents which disclose fastening systems of background interest are:

U.S. Pat. No. 2,627,311 to H. A. Kaufmann
U.S. Pat. No. 4,153,981 to Stuppy
U.S. Pat. No. 4,279,064 to Simme
U.S. Pat. No. 4,341,255 to Mock
U.S. Pat. No. 4,607,876 to Reed
U.S. Pat. No. 4,639,033 to Wheatley et al.
U.S. Pat. No. 4,730,866 to Nett
U.S. Pat. No. 4,792,179 to Stevens
U.S. Pat. No. 4,926,605 to Milliken et al.
U.S. Pat. No. 5,165,750 to Pirhonen
U.S. Pat. No. 5,203,055 to Broadwater, Sr.
U.S. Pat. No. 5,207,262 to Rushford Accordingly, a need exists for a tonneau cover assembly that secures a cover without the use of adhesives, stitches, or snaps. Furthermore, a need exists for a single, versatile system which is capable of accommodating a number of different cover assembly elements.

SUMMARY OF THE INVENTION

It is an object of the present invention to provide an improved adjustable framed fastening system for a tonneau cover which obviates or minimizes the drawbacks discussed above.

A more specific object of the invention is to provide a system having an extruded frame in a basic shape of a small letter h lying on its face that is connected at four corners with overlapping corner joiners to form a rectangle. The h-extruded frame includes an inner channel.

Another object of the invention are fastening strips used to securely attach a fabric to an extended framework for use as a tonneau cover, so as to avoid stitching or presizing of the fabric.

A further object of the invention is to provide fastening strips, which can be L-shaped or Z-shaped.

The above and other objects are achieved, according to the present invention by a fastening system for a tonneau cover utilized to cover an opening in a structure, the opening having a periphery, the structure having sidewalls surrounding the opening and extending along the periphery of the opening, and the system including means defining a h-shaped extrusion frame mountable on the sidewall, so as to surround the opening, a fabric for covering the opening and L-shaped or Z-shaped fastening strips for securing the fabric to the frame, the improvement wherein the said fastening means system includes the said h-shaped frame extrusion having an inner channel, whereas the said fabric is wrapped around the lip and back under the lip, stretching around an underside of the h-shaped extruded frame and the said fastening strip is attached to sandwich the fabric, wherein the fabric and the fastening strip are attached to the inner channel of the h-shaped extrusion frame by means of a screw, nut bolt, rivet, clip and the like, the fabric is wrapped around all the four sides of the extruded frame to complete the tonneau cover; and bars, bows, panels, or flat sheet material are inserted into the inner channel. The tonneau cover may then be screwed, bolted, clamped, or hinged mounted to the area it covers.

DESCRIPTION OF THE PREFERRED EMBODIMENTS

Figure 1:
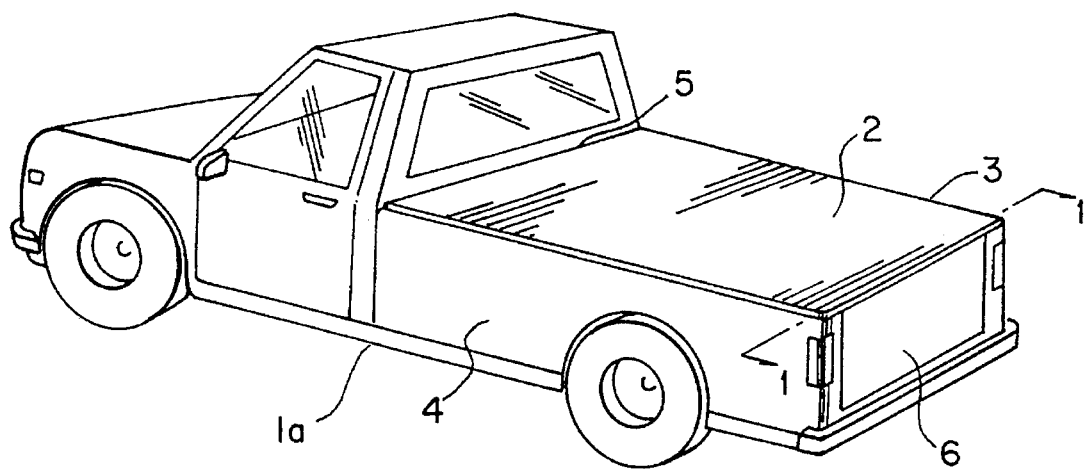
FIG. 1 is an isometric view of a typical pickup truck showing the invention covering the bed thereof.
Figure 2:
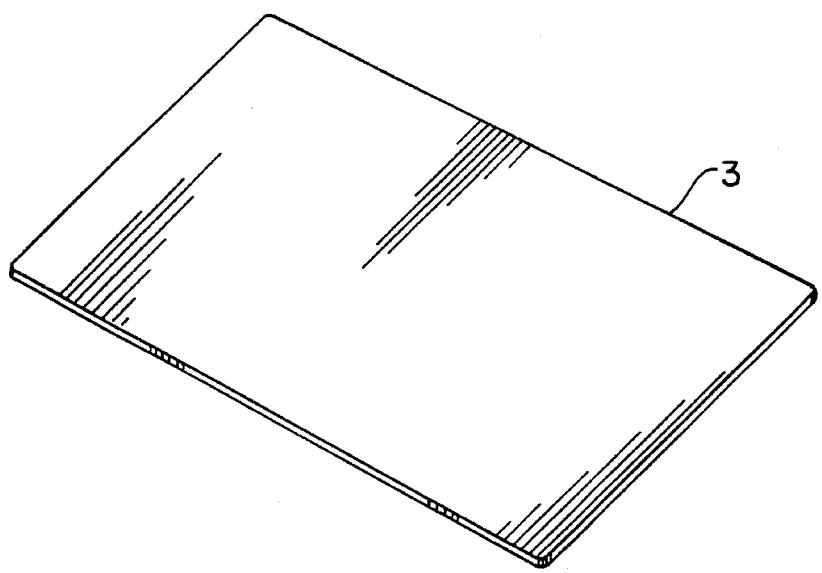
FIG. 2 is a plan view of the embodiment of the bed shown in FIG. 1.

With reference to FIG. 1 a typical pickup truck (1) is illustrated and presents a truck body (1a) having a bed (2) covered by a tonneau cover (3). The tonneau cover (3) is built by a cover fastening system used in combination with a sheet of flexible material or fabric. The truck body (1a) has sidewalls (4), a front shelf (5) and an end gate (6). The principal use contemplated for a system according to the present invention is as a cover for an open bed truck as illustrated in FIG. 1. However, one can imagine other advantageous uses such as for covering stationary structures, open areas, etc., and it is expected that those purchasing such a system may utilize it in a wide variety of imaginative ways. FIG. 2 shows the tonneau cover as a planar member.

Figure 3:
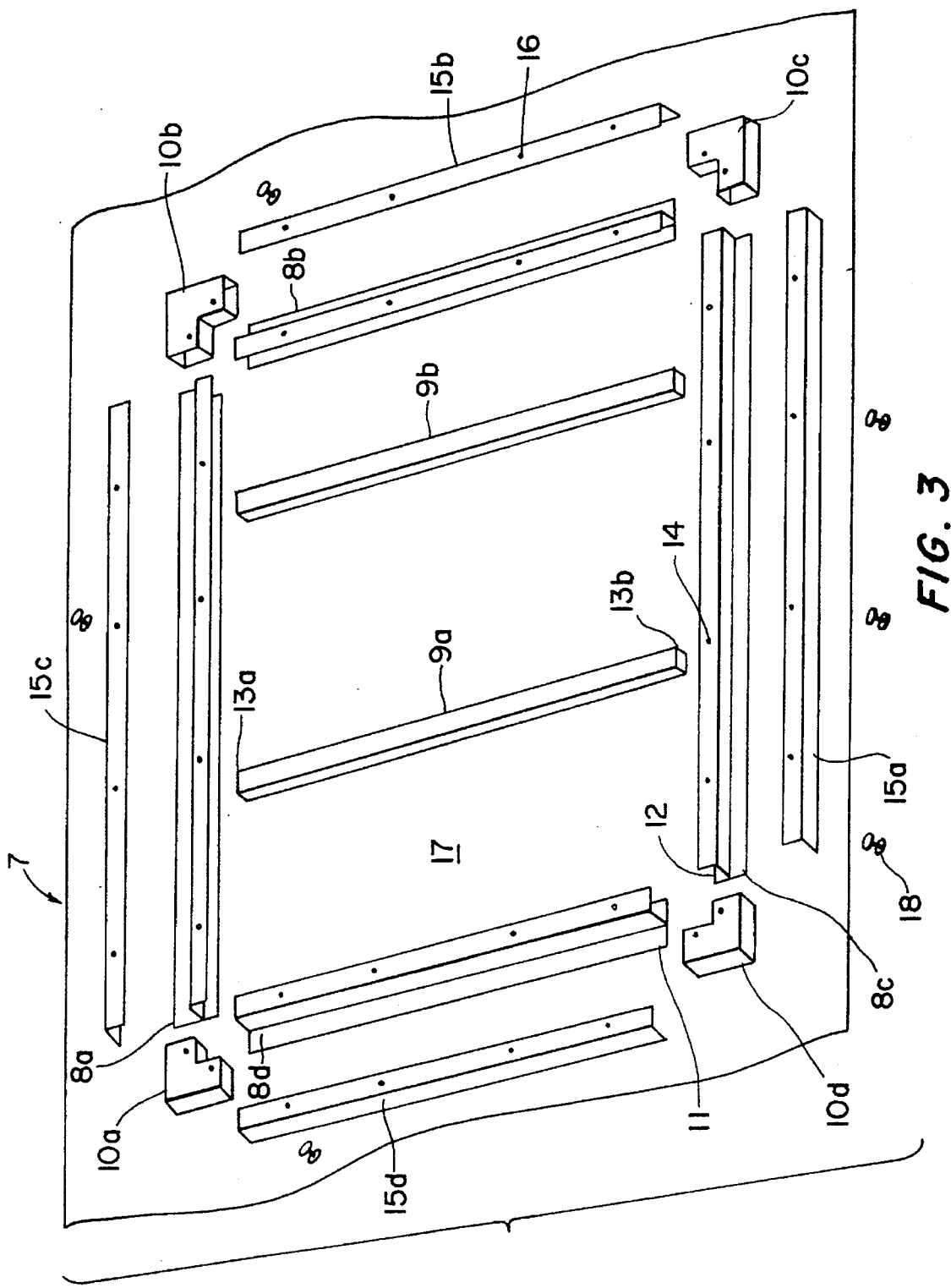
FIG. 3 is an exploded bottom view of the invention shown in FIG. 1 featuring the support rails.

Turning to FIG. 3, the invention provides a tonneau cover (3) employing a frame (7) which may have the form shown in Figure 3 and is composed of h-shaped rails (8a) (8b) (8c) (8d), center support rails (9a) (9b) and corner joints (10a) (10b) (10c) (10d). In each corner of the frame, front rail (8b) and rear rail (8d) will be connected to side rails (8a) (8c) by suitable corner joints which will be assembled to rails (8a) (8b) (8c) (8d) in a manner that will be described below.

Corner joints (10a–10d) are L-shaped and act as socket members for receiving ends (11) of each h-shaped rail. The frame (7) is assembled by inserting the h-shaped rails into the corner joints and simultaneously attaching the central support members. Any type of plastic panel member (22) may also be used within the frame to give further support. Panel side edges (23) are secured within the frame structure and may fit within a channel (12) formed by the h-shaped rails. Thereafter, the corner joints may be attached to the rails by any suitable means, such as rivets or mechanical fasteners.

The tonneau cover according to the invention is intended to cover an opening in a structure and the above described frame is preferably secured to the sidewalls of such an opening by clamps which are well known in the prior art. The clamps enable them to clamp rails to a horizontal surface of a structure which is open toward the interior of the opening to be covered, as will be described in detail below. If the h-shaped rails are to be secured to other sidewall arrangements, such as vertical panels, other known clamp elements can be employed. In any event, the L-shaped rails could always be fastened to sidewalls of the structure to be covered by bolting or by means of sheet metal screws or other suitable fasteners. Otherwise, the cover may just rest on the truck body.

The structure illustrated in FIG. 3 is completed by center support rails which may or may not be needed depending on the preference of the design. The center support rails (9a) (9b) have ends (13a) (13b) which slide into the channels (12) of the h-shaped rails. The center support rails are installed in such a manner as to be readily removable when they are not desired.

Each of the h-shaped extruded rails has a series of apertures (14). Four L-shaped rails (15a) (15b) (15c) (15d) having apertures (16) which mate with those provided in the h-shaped rails are used to secure a fabric web (17) to the frame (7).

Figure 4:
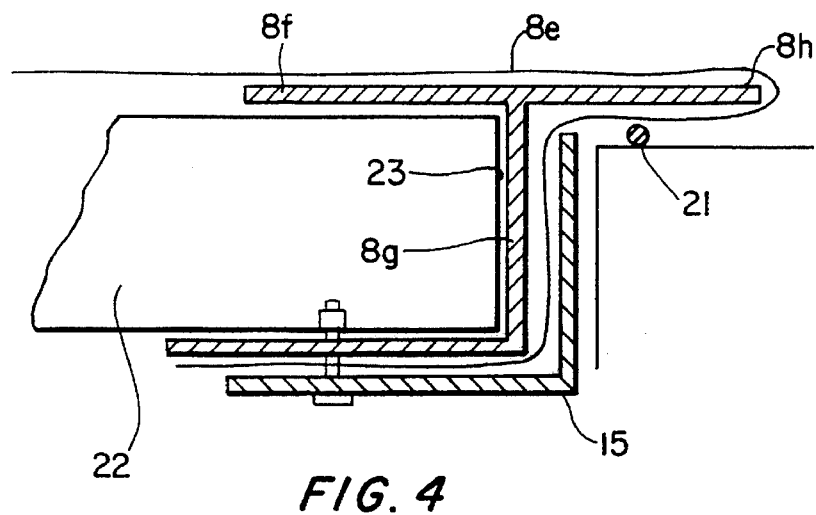
FIG. 4 is a cross sectional view taken along lines 1—1 of FIG. 1 of the present invention.

As illustrated in FIG. 4, each L-shaped rail (15a) (15b) (15c) (15d) is secured to each h-shaped rail by an appropriate number of fastener means (18). A cross sectional view of the fastening system is illustrated in FIG. 4. The illustrated embodiment includes an h-shaped rail having an upper T-area (8e) showing a left side member (8f), a right side area (8h), an upright plank (8g), and a bottom plank (8i). Wrapped and secured around the h-shaped rail is a web of fabric (17) made of suitable weatherproof covering material. The fabric is secured to the h-shaped rail by an L-shaped rail (15) through the use of the fastening system and fastening members (18). Each fastener member fits through mating apertures provided in the bottom plank (8i) of the h-shaped rail and bottom surface of the L-shaped member. The fastener extends through the fabric at the desired location depending on the tightness desired on the fabric surface.

After positioning the fastener through the fabric web and the apertures, the fastener is tightened to form a tight cover connection at each fastening point. By securely connecting each fastener to the appropriate rails and fabric web, a tight novel tonneau cover is formed. The components of the fastening system act together as a huge clamp to secure the web. The fabric web used to create the cover may then be trimmed to size. Use of any size piece of fabric web gives the present invention a unique manufacturing advantage over systems which require a predetermined size of fabric prior to manufacturing. Also shown is the panel member (22) secured in the channel of the h-shaped rail.

Figure 5:
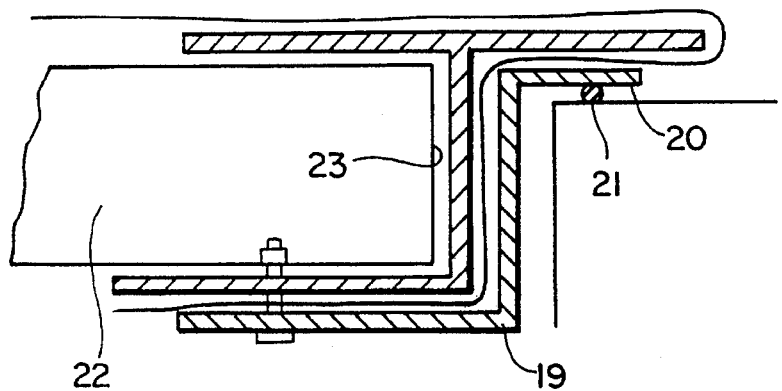
FIG. 5 is a cross sectional view taken along lines 1—1 of FIG. 1 of an alternative embodiment of the present invention.
Figure 6:
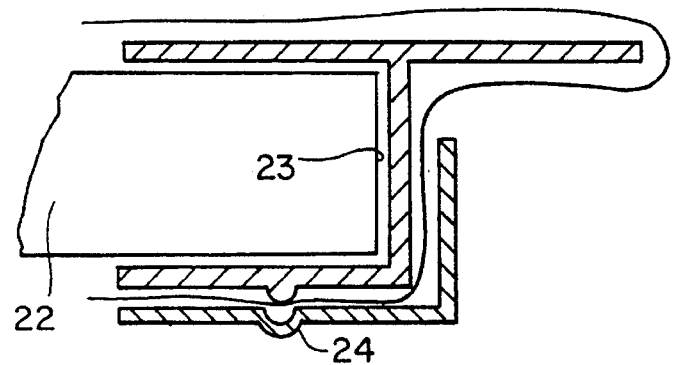
FIG. 6 is a cross sectional view taken along the lines 1—1 of FIG. 1 of a further alternative embodiment of the present invention.

Alternative embodiments are illustrated in FIGS. 5 and 6. Although the embodiment shown in FIG. 5 uses extruded h-shaped rails and a fabric cover, L-shaped rails are replaced by Z-shaped rails (19). The Z-shaped rail illustrated in FIG. 5 includes an added ledge (20) which rests on the inside surface of the truck bed panels for further support. In either embodiment, seals (21) may be provided for keeping moisture out of the bed area.

FIG. 6 illustrates a cross sectional view of yet a further embodiment. Indentations (24) are provided to assist the h-shaped rails and the L-shaped rails in securing the fabric web.

What is claimed:

1. A tonneau cover fastening system for connecting a flexible web to a frame structure, said fastening system comprising:

at least four substantially h-shaped rail members, at least four corner joint means for connecting said h-shaped rail members to form the frame structure, each h-shaped rail member having at least one aperture, at least four substantially L-shaped rail members, each L-shaped rail member having at least one aperture, at least four fastening means for connecting said h-shaped members to said L-shaped members, said fastening means positioned through said h-shaped rail apertures, said L-shaped rail apertures, and said flexible web for fastening said web to said frame structure.

2. A system as defined in claim 1 wherein said fastening system includes a seal means for sealing said cover to a truck body.

3. A system as defined in claim 1 wherein each h-shaped rail member includes a channel for receiving an edge of a panel member.

4. A system as defined in claim 1 wherein each fastening means is a screw.

5. A fastening system for securing a flexible sheet to a substantially h-shaped rail having a channel formed therein, the system comprising:

a substantially h-shaped rail comprising a plurality of apertures, a horizontal base piece, a vertical side piece, and a horizontal top piece, said horizontal base piece having at least one aperture wherein the base piece, the vertical piece and the top piece form a channel, a plurality of fasteners for insertion through said apertures of said h-shaped rail, a substantially L-shaped rail member, said L-shaped rail member having corresponding apertures for mating with said h-shaped rail apertures, and said fasteners secure said sheet.

6. The system according to claim 5, wherein said fastening system includes a panel member, said panel member having panel side edges.

7. The system according to claim 5, wherein said fastening system includes seal means for sealing a truck bed.

\* \* \* \* \*